United States Patent
Dewdney

(10) Patent No.: US 12,436,218 B2
(45) Date of Patent: Oct. 7, 2025

(54) MAGNETIC RESONANCE TOMOGRAPHY UNIT AND METHOD FOR REDUCING IMAGE INTERFERENCE FROM LOW-FREQUENCY MAGNETIC FIELDS

(71) Applicant: Siemens Healthcare GmbH, Erlangen (DE)

(72) Inventor: Andrew Dewdney, Neunkirchen am Brand (DE)

(73) Assignee: Siemens Healthineers AG, Forchheim (DE)

( * ) Notice: Subject to any disclaimer, the term of this patent is extended or adjusted under 35 U.S.C. 154(b) by 152 days.

(21) Appl. No.: 18/507,050

(22) Filed: Nov. 11, 2023

(65) Prior Publication Data
US 2024/0159851 A1    May 16, 2024

(30) Foreign Application Priority Data
Nov. 11, 2022  (EP) .................................... 22206849

(51) Int. Cl.
*G01R 33/565*    (2006.01)
*G01R 33/00*    (2006.01)
(Continued)

(52) U.S. Cl.
CPC ..... *G01R 33/56563* (2013.01); *G01R 33/007* (2013.01); *G01R 33/5608* (2013.01); *G01R 33/583* (2013.01)

(58) Field of Classification Search
CPC .............. G01R 33/007; G01R 33/5608; G01R 33/56563; G01R 33/583
See application file for complete search history.

(56) References Cited

U.S. PATENT DOCUMENTS

| | | | | |
|---|---|---|---|---|
| 7,689,262 | B2 * | 3/2010 | Kruger | G01R 33/243 324/309 |
| 10,502,802 | B1 * | 12/2019 | Kadin | G01R 33/543 |

(Continued)

FOREIGN PATENT DOCUMENTS

| | | |
|---|---|---|
| DE | 102009021026 A1 | 11/2010 |
| JP | H0467848 A | 3/1992 |
| JP | H06181903 A | 7/1994 |

OTHER PUBLICATIONS

Ertan K. et al.: "Spatiotemporal Magnetic Field Monitoring with Hall Effect Sensors" Proceedings of the International Society for Magnetic Resonance in Medicine, ISMRM, Apr. 7, 2017. pp. 1-3.
(Continued)

*Primary Examiner* — Gregory H Curran
(74) *Attorney, Agent, or Firm* — Lempia Summerfield Katz LLC

(57) ABSTRACT

A magnetic resonance tomography unit and a method for operating the magnetic resonance tomography unit are provided. The magnetic resonance tomography unit includes a plurality of magnetic field sensors arranged in an environment of the magnetic resonance tomography unit. The plurality of magnetic field sensors are configured to capture low-frequency magnetic fields in the environment of the magnetic resonance tomography unit and to transmit information about the magnetic fields to the controller via a signal connection. According to the method, fields for compensating the low-frequency magnetic fields are ascertained and output.

14 Claims, 3 Drawing Sheets

(51) Int. Cl.
    *G01R 33/56*     (2006.01)
    *G01R 33/58*     (2006.01)

(56) References Cited

U.S. PATENT DOCUMENTS

2010/0289492 A1    11/2010  Biber et al.
2021/0025954 A1*  1/2021   Biber ................. G01R 33/5608

OTHER PUBLICATIONS

Liu, Chao, et al. "Effect of magnetic field fluctuation on ultra-low field MRI measurements in the unshielded laboratory environment." Journal of magnetic resonance 257 (2015): 8-14.
Vannesjo, Signe J., et al. "Gradient system characterization by impulse response measurements with a dynamic field camera." Magnetic resonance in medicine 69.2 (2013): 583-593.
European search report for application No. 22206849.6 mailed Apr. 11, 2023, with English translation.
Intent to Grant European App. No. 22206849.6 mailed Mar. 25, 2025, with English translation.

\* cited by examiner

MAGNETIC RESONANCE TOMOGRAPHY UNIT AND METHOD FOR REDUCING IMAGE INTERFERENCE FROM LOW-FREQUENCY MAGNETIC FIELDS

This application claims the benefit of European Patent Application No. EP 22206849.6, filed on Nov. 11, 2022, which is hereby incorporated by reference in its entirety.

BACKGROUND

Independent of the grammatical term usage, individuals with male, female, or other gender identities are included within the term.

The present embodiments relate a magnetic resonance tomography unit with a magnetic field sensor and a method for reducing interference from external magnetic fields.

Magnetic resonance tomography units are imaging apparatuses that, in order to map an object under examination, align nuclear spins of the object under examination with a strong external magnetic field and use an alternating magnetic field to excite the nuclear spins to precess about this alignment. The precession or return of the spins from this excited state to a state with lower energy generates an alternating magnetic field as a response that is received via antennas.

With the aid of magnetic gradient fields, spatial encoding is impressed on the signals. The spatial encoding subsequently enables the received signal to be assigned to a volume element. The received signal is then evaluated, and three-dimensional imaging of the object under examination is provided. The signals may be received by using local receiving antennas (e.g., local coils) that are arranged directly on the object under examination in order to achieve a better signal-to-noise ratio.

Despite the high magnetic fields, image capture with the magnetic resonance tomography unit is sensitive to variations in the static or quasistatic B0 magnetic field because the bandwidth of the receiving systems is limited. In addition, it is often necessary to distinguish protons in water from protons in fat in order to be able to map the different types of tissue separately. Due to the low influence of the chemical bonds on the atomic nuclei, the differences in the magnetic moments and the resulting frequency differences of the magnetic resonance signals are very small here, and this leads to high sensitivity to deviations of the static magnetic field.

SUMMARY AND DESCRIPTION

The scope of the present invention is defined solely by the appended claims and is not affected to any degree by the statements within this summary.

The present embodiments may obviate one or more of the drawbacks or limitations in the related art. For example, mapping properties of a magnetic resonance tomography unit may be improved.

A magnetic resonance tomography unit according to the present embodiments includes a controller. A controller may be a computer or control system that controls a sequence in the magnetic resonance tomography unit during image capture (e.g., temporal coordination and signals for the gradients), but also radio-frequency transmission and receipt.

The magnetic resonance tomography unit according to the present embodiments also includes a plurality of magnetic field sensors. A magnetic field sensor may be a sensor that may capture the strength of at least one magnetic field component or spatial component of a magnetic field or the magnetic field vector. Herein, the magnetic field to be captured has a magnetic field strength below that of the static magnetic field B0 (e.g., below 0.1 T, 10 mT, 1 mT, or 100 microtesla). For example, the resolution of the magnetic field sensor is better than 100 microtesla or 1 microtesla. Herein, the magnetic field sensor has a temporal resolution below 100 Hz, 10 Hz, 1 Hz, or 0.1 Hz. The interfering low-frequency magnetic fields may, for example, be caused by passing streetcars, trains, or other electric vehicles. Other possible sources are electric motors in elevators or machines.

The magnetic field sensors are arranged in the environment of the magnetic resonance tomography unit. Environment may be a region outside a magnetic resonance tomography unit or at least on an inner side of a housing of the magnetic resonance tomography unit. In one embodiment, the magnetic field sensors are arranged in such a way or far enough away from the magnetic resonance tomography unit to provide that the saturation of the magnetic field sensors is not controlled by the static magnetic field of the field magnet and the magnetic field sensors are still able to detect external interfering magnetic fields (e.g., at a distance of greater than 1 m or 2 m). In one embodiment, the magnetic field sensors are arranged within the room in which the magnetic resonance tomography unit or the field magnet is located.

The magnetic field sensors have a signal connection to the controller and may transmit information about the captured magnetic field proactively or on request/polling. The signal connection may be an analog or digital connection via electrically conductive cables, optical cables, or also wireless (e.g., using WLAN, Bluetooth, or another type of radio technology).

In one embodiment, the magnetic resonance tomography unit may identify interfering magnetic fields using the magnetic field sensors and, as described below with respect to the method, use this information to compensate the interfering magnetic fields using the controller.

The method according to the present embodiments includes the act of capturing an interfering magnetic field or interference field in the environment of the magnetic resonance tomography unit with the magnetic field sensors by the controller using the magnetic field sensors. Herein, a magnitude or a strength of at least one magnetic field component is captured at a plurality of points in the space around the magnetic resonance tomography unit. Herein, the magnetic field sensors may surround the magnetic resonance tomography unit such that the magnetic field sensors are located at corner points of a polyhedron surrounding the magnetic resonance tomography unit. In one embodiment, the polyhedron may include openings in directions in which no variable source is to be expected. If the magnetic field on a surface around the magnetic resonance tomography unit is known, the field equations for magnetic fields may be used to determine the magnetic field in the interior (e.g., taking into account known sources in the interior) and thus also in the image capturing region. This is also known as the Huygens box.

Herein, the capturing may also take place continuously or at predetermined intervals. The capturing may also include preprocessing. For example, filtering or pre-distortion may be provided in order to take account of a time dependence or frequency dependence of the sensors or transfer function of the magnetic field between the sensor and the image capturing region. For example, alternating magnetic fields with a higher frequency are attenuated more strongly by eddy currents in metallic parts of the magnetic resonance tomography unit.

Once the magnetic resonance tomography unit or its controller is aware of the interfering magnetic field in the image capturing region, its effect on the image to be generated may be compensated in various ways according to the method according to the present embodiments.

According to one embodiment, the impacts of this interfering magnetic field on the magnetic resonance data may be compensated or taken into account during reconstruction. An interfering magnetic field that is homogeneous in the image capturing region in a first approximation leads to a shift of the Larmor frequency or its center frequency. In one act of the method, this center frequency or its shift is ascertained in dependence on the interfering magnetic field.

The magnetic resonance data for image capture is then captured in a further act in dependence on this center frequency. For example, a variable-frequency oscillator (e.g., a numerically controlled oscillator (NCO)) may be provided in the receive path to down-mix the magnetic resonance signal to an intermediate frequency. In one embodiment, the controller may set the variable-frequency oscillator in dependence on the ascertained center frequency or the interfering magnetic field in the image capturing region such that the down-mixed magnetic resonance signal has a constant center frequency; thus, the effect of the interfering magnetic field is compensated. In one embodiment, however, the ascertained center frequency or, equivalently, the field strength of the interfering magnetic field or its vector may be captured and stored with the magnetic resonance data so that the changed center frequency is taken into account during the image reconstruction, or the image reconstruction takes place in dependence thereon. Therefore, for the purposes of the present embodiments, image capture also includes image reconstruction.

In one embodiment, the method does not require any design changes to generate a compensation field or any additional energy to generate the compensation field.

In another embodiment of the method, it is provided that the impacts of the interfering magnetic field are compensated before the capture of the magnetic resonance data by cancelling the interfering magnetic field out with a compensation magnetic field.

For this purpose, in one act, a quasistatic compensation magnetic field and/or gradient field offset is ascertained in dependence on the captured magnetic field and fully or partially compensates the captured interfering magnetic field for image capture. The compensation magnetic field may be a field identical in magnitude to the interfering magnetic field in the image capturing region, but with inverse polarity.

Accordingly, in the case of sources in a plane with the magnetic resonance tomography unit, ascertainment is possible using known values at a border of the magnetic resonance tomography unit in the plane. The same applies to the ascertainment of the center frequency.

The controller then outputs the ascertained static magnetic field and/or the gradient field offset. For example, separate compensation coils may be provided. For example, Helmholtz coil pairs may be provided for one or all spatial directions. It is also possible that, when actuated by a current that generates parallel and rectified magnetic fields in both coils of a gradient coil pair, also referred to as gradient field offset, the gradient coils may generate corresponding compensation fields.

In a further act, magnetic resonance data for imaging is captured in the presence of the compensation fields, with the known sequences, including the use of methods such as fat saturation.

In one embodiment, time-limited compensation fields, the strength of which is modified such that the integral effect on a subsequence is equivalent, may be provided.

In this embodiment, compensation may be transparent to the magnetic resonance data capture and image reconstruction so that no changes are required here.

In one embodiment, mapping is reconstructed from the captured magnetic resonance data. As already explained, in one embodiment, reconstruction may also take place in dependence on the magnetic field captured by the magnetic sensors in order to compensate its effect in the mapping. In one embodiment, values relating to the interfering magnetic field may be stored with the magnetic resonance data. Reconstruction may be executed on the controller of the magnetic resonance tomography unit, but also by a dedicated reconstruction computer as part of the magnetic resonance tomography unit or on a remote resource such as a server or a cloud resource. The mapping is output to the user on a display (e.g., at the magnetic resonance tomography unit itself or at a diagnostic workstation).

In one embodiment, the two embodiments may be combined in an advantageous manner. For example, the variable-frequency oscillator may compensate constant center frequency shifts via the captured magnetic resonance data. A gradient of the interfering magnetic field may require a location-dependent change of the center frequency. The gradient of the interfering magnetic field may be compensated by varying the field gradient generated by the gradient coils. In one embodiment, in this way, the usually stronger zero-order components are compensated by the center frequency without additional energy expenditure, while the weaker first and higher order components are eliminated by generated compensating magnetic fields with reasonable energy expenditure.

In one embodiment, the method according to the present embodiments and the magnetic resonance tomography unit according to the present embodiments enable complete or at least partial compensation of low-frequency magnetic interference fields.

In one possible embodiment of the magnetic resonance tomography unit according to the present embodiments, the controller is configured to change a quasistatic magnetic field and/or a gradient field during image capture in dependence on the information about the magnetic fields so that the influence of the captured magnetic field on image capture is reduced. In other words, the controller is configured to execute the above-described method according to the present embodiments by ascertaining and outputting a compensation field based on the magnetic fields captured with the magnetic field sensors and to reduce the impacts of an external interference field. In this context, a quasistatic magnetic field refers to a magnetic field that, in contrast to a magnetic field B0 of the superconducting magnet that is constant for a measurement, changes on a time scale with the magnetic field captured by the magnetic field sensors, but also by a frequency that is lower by orders of magnitude than the Larmor frequency of the B1 field of the nuclear spins.

In one embodiment of the magnetic resonance tomography unit, the magnetic field sensors include a semiconductor sensor. Hall sensors may be provided, for example.

In one embodiment, semiconductor sensors enable the provision of small, low-cost, and robust magnetic field sensors.

In one possible embodiment of the magnetic resonance tomography unit according to the present embodiments, the magnetic field sensors are configured to capture a magnetic field direction of an interfering magnetic field. Three magnetic field sensors, such as, for example, Hall sensors, each of which captures the strength of a component perpendicular to the planar alignment of the semiconductor, may be combined. The three sensors may be aligned orthogonally to one another so that all three components of the magnetic field are captured, and the magnetic field is thus completely defined. In one embodiment, individual sensors may be combined at different locations with different sensitivity directions in order to capture the magnetic field. This may, for example, be provided if the source of the interfering magnetic field is further away and hence spatial variation at the location of the magnetic resonance tomography unit is low.

In one embodiment, complete spatial capture of the interfering magnetic field enables better compensation.

In one embodiment of the method, the method also includes the act of outputting a predetermined magnetic calibration field by a calibration source. In one embodiment, the calibration source may, for example, be a well-defined direct current source or a source of low-frequency alternating current with a frequency of, for example, less than 100 Hz, 10 Hz 1 Hz, or 0.1 Hz which passes a current through a calibration coil and in this way generates a magnetic field. In one embodiment, the magnetic field of the coil is well known for a known current flowing through the calibration coil. For example, an annular calibration coil for which the magnetic field may be analytically calculated using the Biot-Savart law may be provided. With a known position and alignment of the calibration coil, the magnetic field generated by the calibration coil is then known, at least at the location of the calibration coil and in a free environment thereof (e.g., at the location of the magnetic field sensors in the environment of the calibration coil).

In a further act, the magnetic calibration field is captured with the magnetic field sensors in the environment of the magnetic resonance tomography unit. In this way, the magnetic field sensor may be calibrated using the known magnetic calibration field (e.g., a function may be ascertained as the relationship between the sensor signal and the magnetic field at the location of the sensor).

In another act, the magnetic calibration field is captured in an image capturing region using a calibration sequence. Conceivable sequences are also those known for capturing "gradient impulse response functions (GIRFs), described, for example, in Johanna Vannesjo et. al., "GIRF gradient system characterization by impulse response measurements with a dynamic field camera," February 2013 Magnetic Resonance in Medicine 69(2). This enables a temporal course or frequency dependence and/or time dependence of the transfer function to be captured. From this, it is possible to determine a functional relationship, optionally also time-dependent or frequency-dependent, between the calibration field and the deviations in the image capturing region caused thereby as a first transfer function. This measurement may be repeated with different calibration fields. Herein, the magnetic fields may differ in direction and/or strength. For example, if the number of different measurements is greater than or equal to the number of magnetic field sensors used, it is possible to determine a clear and reversable functional relationship.

This first transfer function is used in the act of ascertaining a static magnetic field and/or gradient field offset (e.g., by ascertaining the interfering magnetic field in the image capturing region or FoV with this first transfer function from the measured values of the magnetic field sensors).

In one embodiment, the first transfer function may also be used to ascertain the center frequency or its shift due to the interfering magnetic field.

Hence, the interfering magnetic field in the FoV, and thus the required compensation field or the shift of the center frequency, may be ascertained more accurately and easily from the measured values of the magnetic field sensors.

In one possible embodiment of the method, the method also includes the act of outputting a predetermined magnetic field and/or a gradient field offset by the controller. For example, one or more of the gradient coils or one or more compensation coils may be subjected to a predetermined calibration current. The calibration current may be a direct current or a low-frequency alternating current. In one embodiment, the temporal course of the alternating current is dependent on the captured temporal course of the magnetic interference field (e.g., both have similar frequencies or a similar frequency spectrum).

In a further act, as described above, the magnetic field generated by the calibration current with the compensation coil(s) or gradient coil(s) is captured in an image capturing region using a calibration sequence. This measurement may be repeated with different calibration currents. For example, if the number of different measurements is greater than or equal to the number of compensation coils or gradient coils used, it is possible to determine a unique and reversible functional relationship. In this way, a functional relationship or a second transfer function between the currents output or set by the controller through a gradient coil or compensation coil and the magnetic field generated thereby in the image capturing region/FoV is ascertained.

In the act of ascertaining a static or low-frequency magnetic field and/or gradient field offset, ascertainment then takes place in dependence on the second transfer function. For example, the first transfer function may be used to determine the interfering magnetic field in the image capturing region from the measured values of the magnetic field sensors. A magnetic field for compensation of the interfering magnetic field is then to have the same strength and inverse direction. An inverse function of the second transfer function may then be used to ascertain from this the required currents to which the compensation coil(s) or gradient coil(s) are to be subjected. Herein, the inverse function may also be ascertained by numerical methods.

Since the image capture is primarily sensitive to the strength of the magnetic field, but less so to the direction, the magnetic field sensors and, as a result, the transfer functions may not completely map the interfering magnetic field in all components, but rather to have smaller dimensionality than would be necessary for this.

In one embodiment, the second transfer function or its inverse function enables the required correction currents to be ascertained more quickly and thus improves the upper limit frequency of the compensation.

In principle, the first transfer function and the inverse of the second transfer function may be provided by a trained neural network or more generally by a type of AI. Herein, the input values of the neural network are the measured values of the magnetic field sensors. The output values of the neural network are the actuation channels for the compensation coils. Herein, the calibration coils may generate artificial interfering magnetic fields as training data. As described above, the magnetic field in the image capturing region is, for example, measured on a phantom using a sequence as used to capture "GIRFs". In one embodiment, a field camera may be used. The target value is the undisturbed homogeneous magnetic field B0 of the field magnet, or, in the case of combined B0 shimming, an ideal homogeneous magnetic field. The deviation of the captured magnetic field from this target value is then used to correct the parameters of the neural network using back-propagation.

The above-described properties, features, and advantages of the present embodiments and also the manner in which these are achieved will become clearer and more plainly comprehensible in connection with the following description of the embodiments explained in more detail in connection with the drawings.

DETAILED DESCRIPTION

Figure 1:
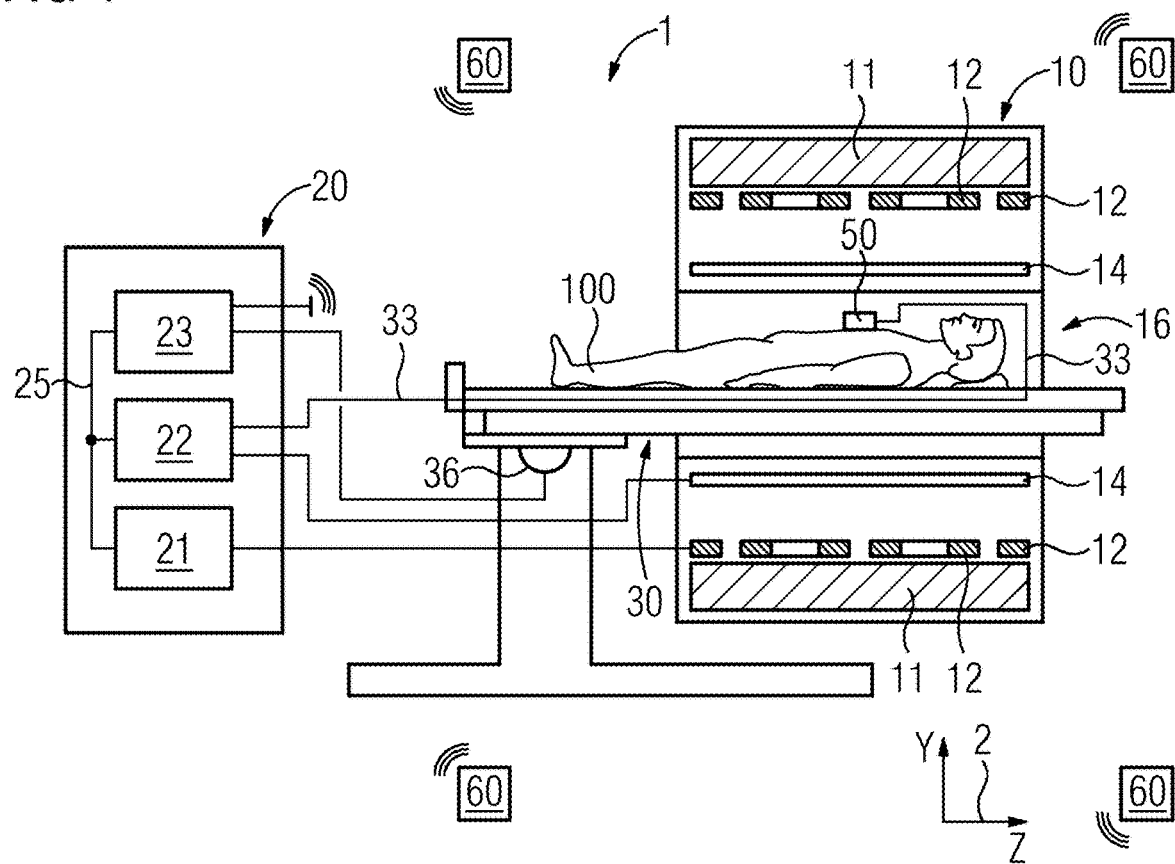
FIG. 1 is a schematic representation of a magnetic resonance tomography unit according to an embodiment.

FIG. 1 is a schematic representation of an embodiment of a magnetic resonance tomography unit 1.

The magnet unit 10 includes a field magnet 11 that generates a static magnetic field B0 for aligning nuclear spins of samples or a patient 100 in a recording region. The recording region is characterized by an extremely homogeneous static magnetic field B0, where the homogeneity, for example, relates to the magnetic field strength or the magnitude. The recording region is almost spherical and arranged in a patient tunnel 16 extending in a longitudinal direction 2 through the magnet unit 10. A patient bench 30 may be moved in the patient tunnel 16 by the moving unit 36. The field magnet 11 may be a superconducting magnet able to provide magnetic fields with a magnetic flux density of up to 3 T, or even more in the case of the latest devices. However, it is also possible to use permanent magnets or electromagnets with normally conducting coils for lower magnetic field strengths.

Further, the magnet unit 10 includes gradient coils 12 configured for spatial differentiation of the captured mapping regions in the examination volume, to superimpose temporally and spatially variable magnetic fields in three spatial directions on the magnetic field B0. The gradient coils 12 may be coils made of normally conducting wires able to generate fields that are orthogonal to one another in the examination volume.

The magnet unit 10 also includes a body coil 14 configured to radiate a radio-frequency signal supplied via a signal line into the examination volume, to receive resonant signals emitted by the patient 100, and to deliver the received resonant signals via a signal line.

A control unit 20 supplies the magnet unit 10 with the different signals for the gradient coils 12 and the body coil 14 and evaluates the received signals.

Thus, the control unit 20 includes a gradient actuation system 21 configured to supply the gradient coils 12 via leads with variable currents that provide the desired gradient magnetic fields in the examination volume in temporal coordination.

The control unit 20 also includes a radio-frequency unit 22 configured to generate a radio-frequency pulse with a prespecified temporal course, amplitude, and spectral power distribution in order to excite a magnetic resonance of the nuclear spins in the patient 100. Herein, pulse powers in the kilowatt range may be achieved. The excitation signals may be radiated into the patient 100 via the body coil 14 or also via a local transmitting antenna.

A controller 23 communicates with the gradient control system 21 and the radio-frequency unit 22 via a signal bus 25.

To receive the magnetic resonance signal, a local coil 50 according to the present embodiments is arranged on the patient 100 in the patient tunnel 16 in order to capture magnetic resonance signals from an examination region in the immediate vicinity with the greatest possible signal-to-noise ratio. The local coil 50 is in signal connection with a receiver in the radio-frequency unit 22 via a connecting line 33.

A plurality of magnetic field sensors 60 are arranged around the magnetic resonance tomography unit 1. The magnetic field sensors 60 exchange information with the controller 23 of the magnetic resonance tomography unit 1 via a signal connection, here indicated as a wireless radio connection, for example, via WLAN or Bluetooth. For example, the magnetic field sensors 60 emit information about magnetic fields captured thereby. This information may, for example, include a magnitude of the captured magnetic field or the magnitude of one, more, or all three spatial magnetic field components. In one embodiment, the magnetic field sensors 60 may send this information to the controller 23 upon request or polling. However, the magnetic field sensors 60 may only send this information at certain intervals or when a change in the magnetic field greater than a threshold value has occurred.

The signal connection may also be wired, for example, via electrical or optical cables. The information may be transmitted in an analog manner via a voltage, current, or modulated carrier or also in a digital manner.

Herein, the magnetic field sensors 60 are configured to capture magnetic fields in an order of magnitude of the magnetic interference fields and also to resolve the magnetic interference fields (e.g., to reproduce the magnetic interference fields in the signal output by the magnetic field sensor 60 sufficiently for compensation). In one embodiment, the FOV resolution is less than 5%, 1%, 0.1%, or 0.01% of a maximum amplitude of an interference field. The maximum amplitude of the magnetic interference field may be considered to be at least the Earth's magnetic field (e.g., 50 microtesla). The maximum amplitude may also be considered to be the frequency-dependent limit values for low-frequency magnetic fields, which may be up to 40 mT.

In one embodiment, at the expected magnetic field strengths, the magnetic field sensor 60 is still within a substantially linear operating range. This may be achieved by the distance of the magnetic field sensors 60 from the field magnet 10 and the gradient coils 12 being such that their magnetic field at the location of the magnetic field sensor 60 is below the maximum amplitude of the expected magnetic interference field. The magnetic field sensors 60 are configured not to reach saturation at the maximum amplitude of the expected magnetic interference field. Typical values for the strength of the interference fields are between 100 nT and 20000 nT. In one embodiment, the magnetic field sensors 60 are arranged at a distance from the field magnet of between 1 and 5 m.

Figure 2:
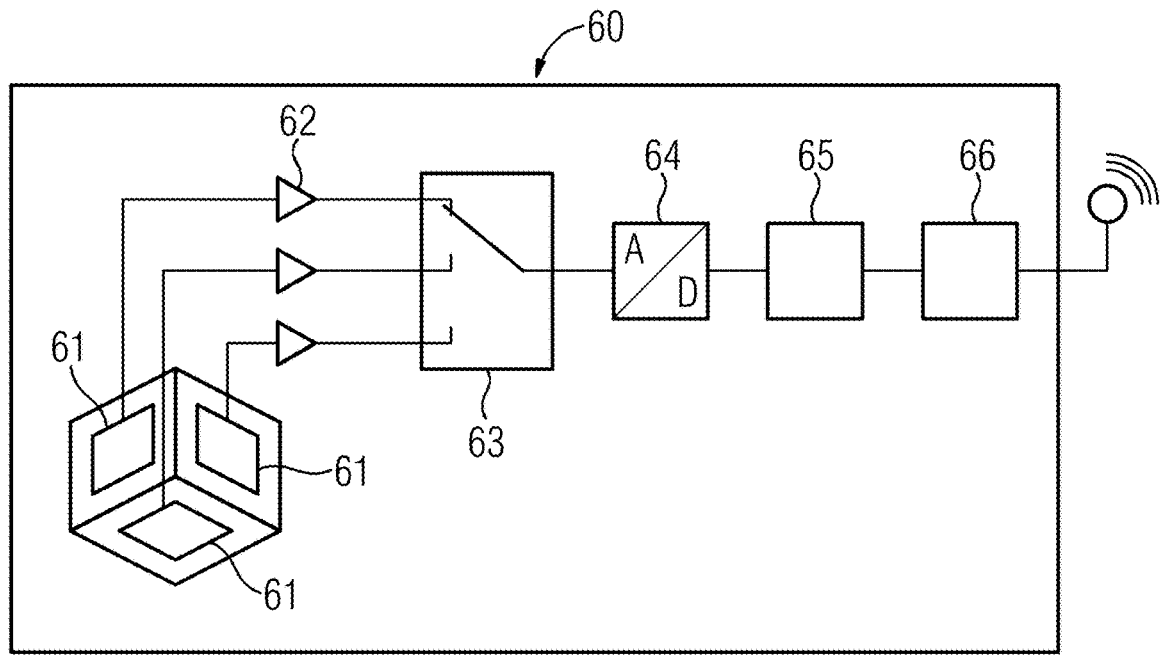
FIG. 2 is a schematic representation of an example of a magnetic field sensor.

FIG. 2 is a schematic representation of an example of a magnetic field sensor 60. For example, the magnetic field is captured using Hall sensors 61 with a flat semiconductor material to which voltage is applied via first contacts on two opposite sides of a surface so that a current flows between the contacts. A magnetic field component flowing through the surface parallel to the normal vector causes a voltage at second contacts that is tapped at two opposite sides of the surface transverse to a direction of the current. The voltage is substantially proportional to a strength of the magnetic field component parallel to the normal vector. Three Hall sensors 61 having normal vectors that span a three-dimensional space (e.g., a Cartesian space) may be used to capture the direction and strength of the magnetic field.

The tapped voltages of the Hall sensors 61 are amplified by amplifiers 62 and fed in time-division multiplex to an A/D converter 64 via a multiplexer 63. The signals are further conditioned in a signal processor 65 (e.g., filtered) and prepared for transmission. For example, data packets may be provided with an assignment of the individual measured values to the respective Hall sensors and thus to the spatial direction and a time reference. In one embodiment, an initial evaluation may take place in terms of magnitude and direction, or only changes to the magnetic field may be detected and transmitted in each case. The data packets are then transmitted wirelessly via a radio-frequency unit 66. Transmission may, for example, take place according to a standard such as Bluetooth or WLAN.

Different solutions may be provided within the scope of the present embodiments with respect to the magnetic field sensor. For example, instead of Hall sensors 61, it is possible to use other magnetic field sensors that are, for example, based on micromechanics/MEMS or other effects, such as, for example, magneto-optical or quantum effects. In one embodiment, a magnetic field sensor 60 in each case may only capture one component of the magnetic field, and a plurality of magnetic field sensors 60 may be distributed with different alignments with respect to the room or the magnetic resonance tomography unit. The signal transmission may also take place via a cable, electrically or optically. Analog transmission of the signals may also be provided.

Figure 3:
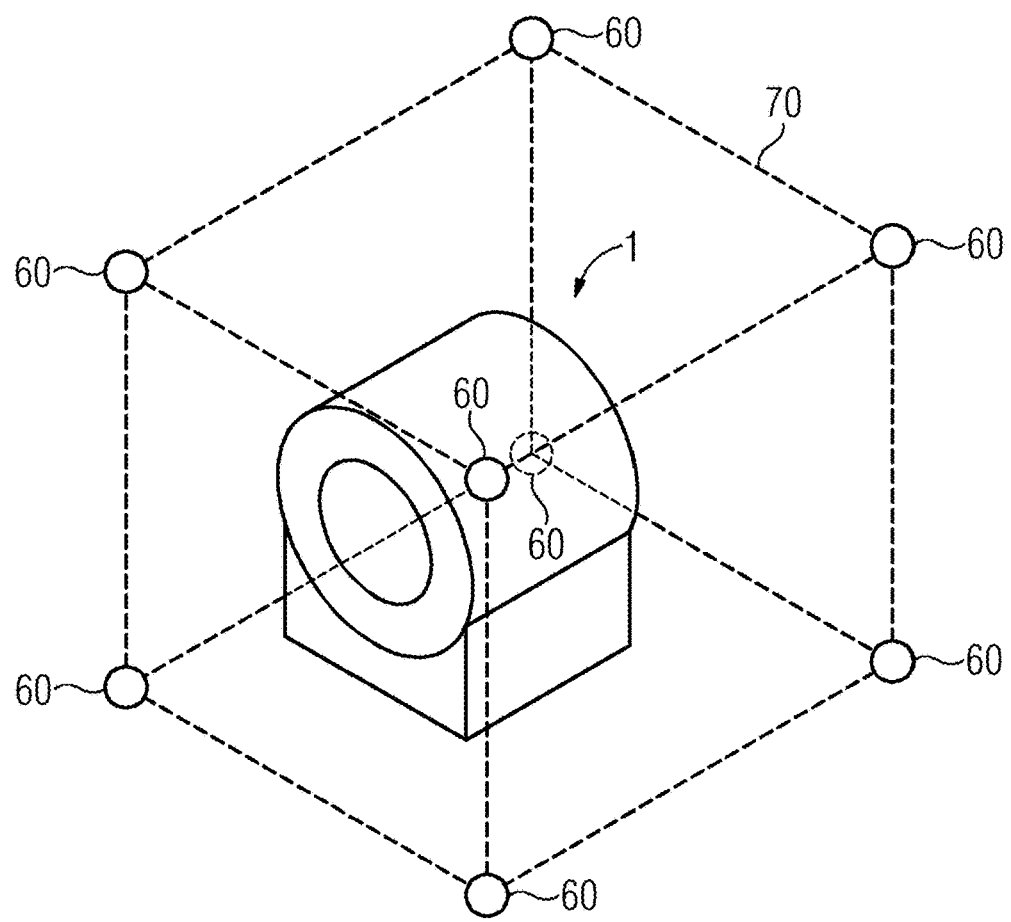
FIG. 3 shows a magnetic resonance tomography unit according to an embodiment with an example of an arrangement of magnetic field sensors.

FIG. 3 shows an example of an arrangement of magnetic field sensors 60 of a magnetic resonance tomography unit 1 according to the present embodiments. In one embodiment, the magnetic field sensors 60 are arranged at corners of a polyhedron 70 in an interior of which the magnetic resonance tomography unit 1 is located. By way of example, a cuboid or cube is depicted. In one embodiment, a tetrahedron is provided as the simplest polyhedron or polyhedron with a number of corners. Herein, the polyhedron 70 is not necessarily regular, but depends on the boundary conditions. For example, the magnetic field sensors 60 may be arranged in the same room as the magnetic resonance tomography unit 1 so that the polyhedron 70 is to fit into the room. In one embodiment, the ceiling height is less than the length and width dimensions so that the polyhedron 70 is flattened in order to fit into the room. As discussed previously, the distances of the magnetic field sensors 60 from the field magnet 10 and the gradient coils 12 are selected such that the magnetic field sensors 60 do not saturate due to the stray field from the field magnet 10 and/or the gradient coils 12. In one embodiment, predetermined corner points may not to be occupied by magnetic field sensors 60 if boundary conditions, such as predetermined directions or exclusion directions of the sources with respect to the magnetic resonance tomography unit 1, exist for the magnetic interference fields. Herein, the number of magnetic field sensors 60 influences the quality of the compensation. The more accurately a magnetic interference field is captured by the magnetic field sensors 60, the more accurately a resulting interference field in the image capture space may be determined using the first transfer function. Herein, the order of the correction also increases. Two magnetic field sensors 60 may ascertain a gradient of an interference field, and more magnetic field sensors 60 may ascertain correspondingly higher orders. This corresponds to the correction of magnetic fields such as dipole field, quadrupole field, etc. However, the possibilities of compensation are also limited by the coils used to output compensation fields.

Figure 4:
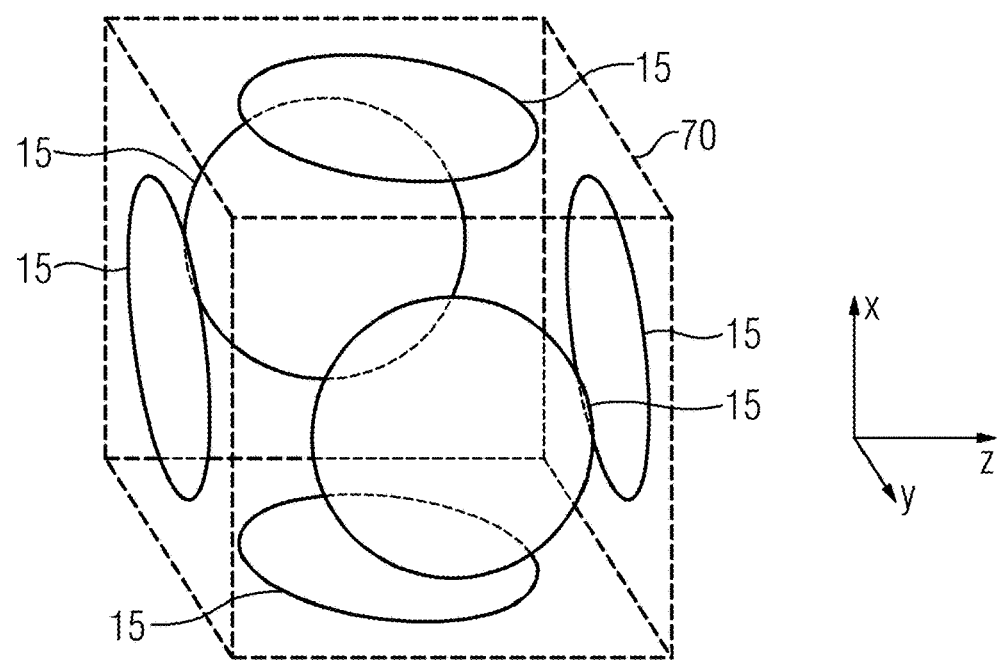
FIG. 4 is a schematic arrangement of coils for generating a compensation field in a magnetic resonance tomography unit according to an embodiment.

FIG. 4 depicts an example of an arrangement of coils for generating a compensation field. Herein, the image capturing region is arranged within the polyhedron 70 (e.g., a cuboid). The compensation coils 15 are in each case arranged in pairs on opposite surfaces of the polyhedron 70, thus in each case forming Helmholtz coil pairs with which in each case homogeneous correction fields may be set in each axis direction x, y, and z and also gradients by applying different current strengths to opposite coils.

In one embodiment, the existing gradient coils 12, which are usually already configured in each case to generate gradients in the x, y, and z direction, are used as compensation coils 15. The addition of compensation currents to the currents required to generate the gradients, or, in sections of the sequence, the compensation currents alone, enables the generation of homogeneous magnetic fields and gradient magnetic fields to compensate external interference fields. Additional coils (e.g., for generating higher order magnetic fields such as quadrupole fields) may also be provided.

Figure 5:
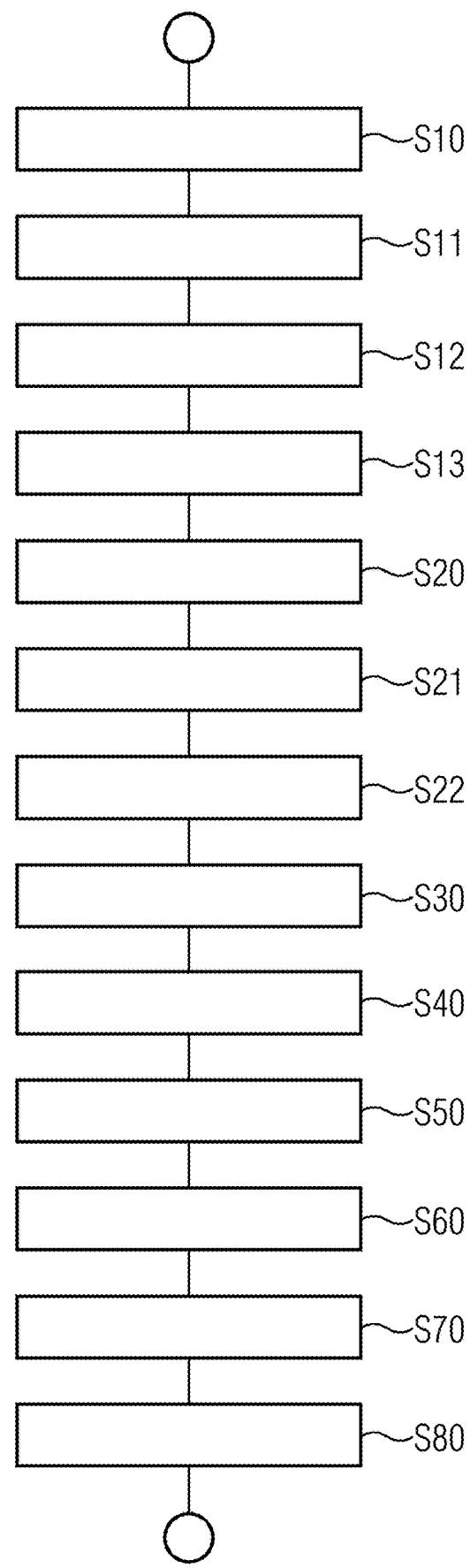
FIG. 5 is a flow chart of a method according to an embodiment.

FIG. 5 shows a schematic flow chart as an example of a method according to the present embodiments.

In act S30, the controller captures a magnetic field in the environment of the magnetic resonance tomography unit 1 using the magnetic field sensors 60. The controller 23 may, for example, request the measured values of the above-described magnetic field sensors 60 at regular intervals. The magnetic field sensors 60 may also deliver their measured values to the controller 23 automatically at predetermined intervals. In one embodiment, the measured value sensors 60 may only notify changes in the captured magnetic field. The capturing may, for example, also include the subtraction of a constant component or offset such as a stray field of the field magnet 10; however, this may only take place in act S40 when ascertaining a compensation field. In one embodiment, capturing may only take place when the magnetic resonance tomography unit 1 itself does not generate any time-varying interference fields (e.g., in phases of sequences in which no gradient magnetic fields are generated by the controller 23).

In act S40, the controller 23 ascertains a magnetic field and/or a gradient field offset for image capture for compensation of the captured magnetic field in dependence on the captured magnetic field. For example, the first transfer function described below may be used to ascertain an interfering magnetic field in the image capture space from the magnetic field captured by the magnetic sensors 60. Compensation then requires a magnetic field that has an inverse direction in the image capturing region with the same magnetic field strength, so that the magnetic field vectors of the interference magnetic field and compensation field cancel each other out in the image capturing region. Herein, the stray fields caused by the field magnet 10 and/or by gradient coils 12 have already been subtracted from the captured magnetic field in act S30 or for this to take place here in act S40.

However, in one embodiment, a shift of the center frequency or changed center frequency caused by the interference field may be ascertained in act S40. In a first approximation, the Larmor frequency and thus also the center frequency of the magnetic resonance signal is proportional to the magnitude of the magnetic field, the sum of the magnetic field B0, and the interference field, at the location of the nuclear spin and the magnetic moment of the nucleus.

In act S50, the controller 23 outputs the ascertained magnetic field and/or the gradient field offset for compensation. Herein, the controller 23 in each case actuates the compensation coils and/or gradient coils 12 with a compensation current that substantially generates the ascertained compensation field. Herein, it is in principle not possible to generate any magnetic fields with a limited number of compensation coils 15. Therefore, the output of the magnetic field or the currents to the compensation coils 15 and/or gradient coils 12 always remains an approximation and may, for example, be solved by solving an optimization problem in which the interfering magnetic field in the image capturing region is minimized. Herein, a second transfer function described below, which indicates the relationship between output compensation currents and the magnetic fields generated in the image capturing region, or their inverse relationship may be used. It may, for example, be possible to vary the compensation currents as parameters in an LSR method until a remaining interfering magnetic field in the image capturing region has minimum energy or the field strength in the entire image capturing region is below a predetermined threshold value.

In one embodiment, a neural network with different interfering magnetic fields may provide the compensation currents or the changed center frequency as output values, either using the interfering magnetic field in the image capturing region as an input parameter or directly with the magnet field values captured by the magnetic field sensors 60. In one embodiment, artificial intelligence may be used based on a different algorithm or hardware.

In a further act S60, the controller 23 of the magnetic resonance tomography unit 1 captures magnetic resonance data for mapping. The output magnetic field is output during at least a part of the sequence required to capture the magnetic resonance data. For example, it may be advantageous not to apply an offset to the gradient coils 12 during the gradients in order to achieve maximum gradient strength. In one embodiment, the entire capturing of the magnetic resonance data takes place with active compensation.

In one embodiment, alternatively or supplementarily to the compensation magnetic field, the changed center frequency of the magnetic resonance signal may be compensated in act S60. In the case of a magnetic resonance tomography unit 1 with a variable oscillator for mixing the magnetic resonance signal to an intermediate frequency, the oscillator frequency may, for example, be changed by the controller 23 in dependence on the ascertained interference field such that the impact of the interference field in the captured magnetic resonance data is at least partially compensated.

In one embodiment, the ascertained interference field or data derived therefrom that reflects an impact of the interference field on the magnetic resonance data, such as, for example, the center frequency, may be captured and stored together with the magnetic resonance data in step S60. Thus, these may be taken into account in subsequent signal processing and/or image reconstruction in order to at least partially compensate the impact of the interference field in the mapping.

In one embodiment, in act S70, mapping is reconstructed from the captured magnetic resonance data. This may take place by the controller 23 or also by an external dedicated reconstruction computer or cloud resource.

In one embodiment, the image reconstruction in act S70 may take place in dependence on the data on the interference field captured with the magnetic resonance data so that the impact of the interference field on the reconstructed mapping is reduced.

In act S80, the reconstructed mapping is output to a user.

In one possible embodiment of the method, a calibration measurement is used to ascertain a relationship between the measured values of the magnetic field sensors 60 of a calibration field and the magnetic interference field generated thereby in the image capturing region in the form of a first transfer function.

For this purpose, in act S10, a predetermined magnetic calibration field is generated by a calibration source. The calibration source may, for example, be a current source and a coil through which a current from the current source flows. For ring-shaped or annular coils, for example, the magnetic field generated in dependence on the current is well known. The coil is arranged at predetermined locations with a predetermined alignment and subjected to predetermined currents. In one embodiment, a low-frequency alternating current may be used, for example, to distinguish the field of the calibration coil from other fields, such as the Earth's magnetic field or a stray field of the field magnet 11.

Time-dependent calibration fields may also be used to capture frequency-dependent attenuation of the interfering magnetic field on the way into the image capturing region, for example, due to eddy currents in the metal cladding.

In act S11, the magnetic calibration field generated by the calibration is captured with the magnetic field sensors 60 in the environment of the magnetic resonance tomography unit 1. Modulation with a low-frequency alternating current enables the calibration field to be distinguished from background magnetic fields using a filter.

Further, in act S12, the magnetic calibration field in an image capturing region is captured by a calibration sequence (e.g., with a homogeneous phantom in the image capturing region). Time-dependent magnetic fields may, for example, be captured by the aforementioned GIRF sequence.

In act S13, a first transfer function that determines a relationship between the external magnetic interference fields captured by the magnetic field sensors 60 and the resulting interfering magnetic fields in the image capturing region is ascertained. The functional relationship may, for example, be an n×m matrix, a linear relationship between the signals of the n magnetic field sensors and m capturing points in the image capturing region. m repeated measurements with different calibration fields may, for example, be used to determine the coefficients of the matrix. Analytical methods in which a method comparable to a Huygens-Box is able to ascertain the fields within a space enclosed by the magnetic field sensors 60 based on the fields on the surface of the shell of the magnetic field sensors 60 may also be used. In one embodiment, a neural network consisting of n inputs and m outputs that is trained by the calibration measurements may be used to determine the magnetic field in the image capturing region from the measured values of the magnetic field sensors.

Then, as already described, the ascertained first transfer function is used during compensation to ascertain or estimate the interfering magnetic field in the image capturing region from the measured values of the magnetic field sensors 60 and then to determine the currents for a compensation field.

Herein, the ascertained transfer function may also be time-dependent or frequency-dependent.

In one embodiment of the method, a second transfer function that establishes a functional relationship between currents through the compensation coil or the offset currents through the gradient coils may be determined. Once again, with p compensation coils or gradient coils involved in the compensation and q measurement points in the image capturing region captured with the above-described calibration sequence, at least q repeated measurements with linearly independent current configurations may be required to determine the p×q transfer matrix. Once again, instead of determining a matrix, a corresponding network or AI that estimates the magnetic fields or the magnetic fields generated in the image capturing region from the compensation currents may be trained.

For this purpose, in act S20, a predetermined magnetic field and/or gradient field offset is output by the controller by applying corresponding predetermined currents to the compensation coils 15 and/or gradient coils 12 by the controller 23. Then, in act S21, the magnetic field generated by the compensation coil 15 and/or gradient field offset in the gradient coils 12 is captured in an image capturing region using a calibration sequence. From this, as already described, the second transfer function may then be determined in act S22, for example, as a matrix or also as a trained neural network.

The second transfer function may be used later when determining the compensation currents in order to ascertain the magnetic fields caused by the compensation currents or, via an inverse function, the required compensation currents for a prespecified compensation field.

Since exact matching of the interfering magnetic field in the image capturing region with the compensation field that may be generated there by the compensation coils only occurs in a few exceptional cases, optimization methods are required, for example, in order to generate the corresponding compensation currents. For example, the sum of the amounts of the deviation or the maximum deviation may be minimized. This function may also be taken over by an appropriately trained neural network or another type of artificial intelligence. In one embodiment, a neural network that uses the measured values of the magnetic field sensors 60 as an input value and directly provides the specifications for the compensation currents as an output value may be provided. A linear time invariant approach, as used in GIRF, may also be used.

Although the invention has been further illustrated and described in detail by the embodiments, the invention is not limited by the disclosed examples, and other variations may be derived therefrom by those skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A magnetic resonance tomography unit comprising:
a controller; and
a plurality of magnetic field sensors arranged in an environment of the magnetic resonance tomography unit,
wherein the plurality of magnetic field sensors are configured to:
capture low-frequency magnetic fields in the environment of the magnetic resonance tomography unit; and
transmit information about the low-frequency magnetic fields to the controller via a signal connection,
wherein the controller is configured to:
change signal processing during image capture in dependence on the information about the low-frequency magnetic fields so that an influence of the captured low-frequency magnetic fields on image capture is reduced;
capture a magnetic field in the environment of the magnetic resonance tomography unit using the plurality of magnetic field sensors; and
ascertain a center frequency of a magnetic resonance signal for image acquisition in dependence on the captured magnetic field,
wherein the magnetic resonance tomography unit further comprises a variable-frequency oscillator in a receive path, the variable-frequency oscillator being configured to down-mix the magnetic resonance signal to an intermediate frequency, and
wherein the controller is further configured to set the variable-frequency oscillator in dependence on the ascertained center frequency in an image capturing region, such that the down-mixed magnetic resonance signal has a constant center frequency, thus compensating for an effect of an interfering magnetic field.

2. The magnetic resonance tomography unit of claim 1, wherein the controller is configured to change a quasistatic magnetic field, a gradient field, or the quasistatic magnetic field and the gradient field during image capture in dependence on the information about the low-frequency magnetic fields so that an influence of the captured magnetic fields on image capture is reduced.

3. The magnetic resonance tomography unit of claim 1, wherein the plurality of magnetic field sensors comprise a semiconductor sensor.

4. The magnetic resonance tomography unit of claim 3, wherein the plurality of magnetic field sensors are configured to capture a magnetic field direction.

5. A method for operating a magnetic resonance tomography unit, the magnetic resonance tomography unit comprising a controller and a plurality of magnetic field sensors, wherein the plurality of magnetic field sensors are arranged in an environment of the magnetic resonance tomography unit, and wherein the plurality of magnetic field sensors are configured to capture low-frequency magnetic fields in the environment of the magnetic resonance tomography unit, and are configured to transmit information about the low-frequency magnetic fields to the controller via a signal connection, the method comprising:

capturing, by the controller, a magnetic field in the environment of the magnetic resonance tomography unit using the plurality of magnetic field sensors;

ascertaining, by the controller, a center frequency of a magnetic resonance signal for image capture in dependence on the captured magnetic field;

capturing magnetic resonance data for imaging in dependence on the center frequency;

down-mixing, by a variable-frequency oscillator of the magnetic resonance tomography unit in a receiving path, the magnetic resonance signal to an intermediate frequency; and setting, by the controller, the variable-frequency oscillator in dependence on the ascertained center frequency in an image capturing region, such that the down-mixed magnetic resonance signal has a constant center frequency, thus compensating for an effect of an interfering magnetic field.

6. The method of claim 5, further comprising:
reconstructing mapping from the captured magnetic resonance data; and
outputting the mapping to a user.

7. The method of claim 5, further comprising:
outputting, by a calibration source, a predetermined magnetic calibration field;
capturing the predetermined magnetic calibration field with the plurality of magnetic field sensors in the environment of the magnetic resonance tomography unit;
capturing, by the controller, the predetermined magnetic calibration field in an image capturing region using a calibration sequence; and
ascertaining a transfer function for a magnetic field between the plurality of magnetic field sensors and the image capturing region,
wherein the ascertaining of the center frequency, ascertaining of a quasistatic magnetic field, ascertaining of a gradient field offset, or any combination thereof comprises ascertaining in dependence on the transfer function.

8. The method of claim 5, further comprising:
outputting a predetermined magnetic field, a predetermined gradient field offset, or the predetermined magnetic field and the predetermined gradient field offset by the controller;
capturing the predetermined magnetic field, the predetermined gradient field offset, or the predetermined magnetic field and the predetermined gradient field offset in an image capturing region using a calibration sequence; and
ascertaining a transfer function for the predetermined magnetic field, the predetermined gradient field offset, or the predetermined magnetic field and the predetermined gradient field offset, and the image capturing region,
wherein ascertaining a quasistatic magnetic field, ascertaining the gradient field offset, or a combination thereof comprises ascertaining in dependence on the transfer function.

9. The method of claim 7, wherein ascertaining the transfer function comprises training a neural network,
wherein input values of the neural network are measured values of the plurality of magnetic field sensors, and output values of the neural network are actuation channels for compensation coils, and
wherein artificial interfering magnetic fields are generated as training data using calibration coils.

10. The method of claim 8, wherein ascertaining the transfer function comprises training a neural network,
wherein input values of the neural network are measured values of the plurality of magnetic field sensors, and output values of the neural network are actuation channels for compensation coils, and
wherein artificial interfering magnetic fields are generated as training data using calibration coils.

11. In a non-transitory computer-readable storage medium that stores instructions executable by a controller of a magnetic resonance tomography unit to operate a magnetic resonance tomography unit, the magnetic resonance tomography unit comprising a controller and a plurality of magnetic field sensors, wherein the plurality of magnetic field sensors are arranged in an environment of the magnetic resonance tomography unit, and wherein the plurality of magnetic field sensors are configured to capture low-frequency magnetic fields in the environment of the magnetic resonance tomography unit, and are configured to transmit information about the low-frequency magnetic fields to the controller via a signal connection, the instructions comprising:

capturing, by the controller, a magnetic field in the environment of the magnetic resonance tomography unit using the plurality of magnetic field sensors;

ascertaining, by the controller, a center frequency of a magnetic resonance signal for image capture in dependence on the captured magnetic field;

capturing magnetic resonance data for imaging in dependence on the center frequency;

down-mixing, by a variable-frequency oscillator of the magnetic resonance tomography unit in a receiving path, the magnetic resonance signal to an intermediate frequency; and setting, by the controller, the variable-frequency oscillator in dependence on the ascertained center frequency in an image capturing region, such that the down-mixed magnetic resonance signal has a constant center frequency, thus compensating for an effect of an interfering magnetic field.

12. The non-transitory computer-readable storage medium of claim 11, wherein the instructions further comprise:
reconstructing mapping from the captured magnetic resonance data; and
outputting the mapping to a user.

13. The non-transitory computer-readable storage medium of claim 12, wherein the instructions further comprise:
outputting, by a calibration source, a predetermined magnetic calibration field;
capturing the predetermined magnetic calibration field with the plurality of magnetic field sensors in the environment of the magnetic resonance tomography unit;
capturing, by the controller, the predetermined magnetic calibration field in an image capturing region using a calibration sequence; and
ascertaining a transfer function for a magnetic field between the plurality of magnetic field sensors and the image capturing region,
wherein the ascertaining of the center frequency, ascertaining of a quasistatic magnetic field, ascertaining of a gradient field offset, or any combination thereof comprises ascertaining in dependence on the transfer function.

14. The non-transitory computer-readable storage medium of claim 11, wherein the instructions further comprise:
- outputting, by a calibration source, a predetermined magnetic calibration field;
- capturing the predetermined magnetic calibration field with the plurality of magnetic field sensors in the environment of the magnetic resonance tomography unit;
- capturing, by the controller, the predetermined magnetic calibration field in an image capturing region using a calibration sequence; and
- ascertaining a transfer function for a magnetic field between the plurality of magnetic field sensors and the image capturing region,
- wherein the ascertaining of the center frequency, ascertaining of a quasistatic magnetic field, ascertaining of a gradient field offset, or any combination thereof comprises ascertaining in dependence on the transfer function.

\* \* \* \* \*